United States Patent
Ritter et al.

(10) Patent No.: US 7,194,253 B2
(45) Date of Patent: Mar. 20, 2007

(54) PRODUCT ORDER METHOD AND SYSTEM

(75) Inventors: Rudolf Ritter, Zollikofen (CH); Eric Lauper, Bern (CH)

(73) Assignee: Swisscom Mobile AG, Bern (CH)

( * ) Notice: Subject to any disclaimer, the term of this patent is extended or adjusted under 35 U.S.C. 154(b) by 672 days.

(21) Appl. No.: 10/146,372

(22) Filed: May 14, 2002

(65) Prior Publication Data

US 2002/0187774 A1    Dec. 12, 2002

Related U.S. Application Data

(63) Continuation of application No. PCT/CH99/00541, filed on Nov. 16, 1999.

(51) Int. Cl.
    *H04M 3/42*    (2006.01)
(52) U.S. Cl. .................. 455/414.1; 455/550.1; 455/414.3; 455/412.1; 455/406; 379/93.12
(58) Field of Classification Search ........... 455/414.1, 455/414.3, 414.4, 415, 422, 412, 406, 517, 455/550.1; 379/93.12, 100.01
    See application file for complete search history.

(56) References Cited

U.S. PATENT DOCUMENTS

| | | | |
|---|---|---|---|
| 5,310,997 A | | 5/1994 | Roach et al. |
| 5,485,246 A | * | 1/1996 | Hayashi et al. ............... 399/1 |
| 5,729,594 A | * | 3/1998 | Klingman ............... 379/93.12 |
| 5,887,253 A | * | 3/1999 | O'Neil et al. ............... 455/418 |
| 6,335,678 B1 | * | 1/2002 | Heutschi ............... 340/286.02 |
| 6,366,696 B1 | * | 4/2002 | Hertz et al. ............... 382/183 |
| 6,466,657 B1 | * | 10/2002 | Anvret et al. ............ 379/93.12 |
| 6,490,443 B1 | * | 12/2002 | Freeny, Jr. ............... 455/406 |
| 6,512,570 B2 | * | 1/2003 | Garfinkle et al. .............. 355/40 |
| 6,512,919 B2 | * | 1/2003 | Ogasawara ............... 455/422.1 |
| 6,707,581 B1 | * | 3/2004 | Browning ............... 358/473 |
| 2004/0076275 A1 | * | 4/2004 | Katz ............... 379/93.12 |

FOREIGN PATENT DOCUMENTS

| | | |
|---|---|---|
| DE | 296 13 393 | 1/1998 |
| DE | 296 13 393 U1 | 1/1998 |
| EP | 0 951 191 A | 10/1999 |
| JP | 09-093319 | 4/1997 |
| WO | WO 97 45814 A | 12/1997 |

* cited by examiner

*Primary Examiner*—Lana Le
*Assistant Examiner*—Angelica Perez
(74) *Attorney, Agent, or Firm*—Pearne & Gordon LLP

(57) ABSTRACT

Method with which a mobile user in a mobile network can order products, with the following steps:
- recording an image corresponding to the product to be ordered,
- linking the image data with a personal identification of the mobile user,
- transmitting the linked order message to a server in said mobile radio network,
- comparing said image data with images stored in a product database, each of said image in said database being linked with an identification of the product provider,
- sending a message containing an identification of the ordered product and of the ordering mobile user to said product provider.

28 Claims, 1 Drawing Sheet

PRODUCT ORDER METHOD AND SYSTEM

The present application is a continuation of application PCT/CH99/00541 filed on Nov. 16, 1999, the content of which is included by reference.

FIELD OF THE INVENTION

The present invention concerns a method for ordering products and information about products.

RELATED ART

Patent EP689368 describes a method for packing and sending data in SMS (Short Message Services) messages through a mobile radio network. With this method, it is possible for example to transmit between various mobile radio devices not only short text messages such as for example "Please call home", but also more complex messages and programs that are automatically recognized by the receiving terminal and can trigger a certain action.

The WAP (Wireless Application Protocol) architecture describes another protocol with which the users of WAP-capable mobile devices can access Internet, Intranet and Internet similar services over various bearers such as SMS, USSD, etc.

It thus becomes possible to use mobile devices as clients in a client-server architecture in a mobile radio network. The advantage of such systems is the possibility of identifying customers, with a high degree of reliability, by means of an identification module, for example by means of a SIM (Subscriber Identification Module) card. It has for example been proposed in patent application WO98/28900 to enter order codes in a mobile device, in order for example to order products or services from a supplier. These order codes are standardized and contain at least a first field with which a supplier is clearly identified, as well as a second field with which a certain product from that supplier is indicated. Additional fields can furthermore be defined, in order for example to indicate the type of transaction and the mode of payment. The customer is reliably identified by the infrastructure in the network. The order codes entered by the users are transmitted to a clearing station in the mobile radio network and automatically assigned by it to the supplier indicated. The chosen supplier receives an order from the customer with a clear identification of this customer and of the ordered product or of the desired service.

The typing of the order codes, which may contain many characters, with an often miniaturized and incomplete keyboard is laborious and susceptible to errors. Furthermore, it can be difficult for a provider to make product codes known quickly.

Another method requiring the typing of order codes on the keyboard of a mobile telephone is described in EP-A1-0951191.

DE-U1-29613393 describes a mobile telephone with a barcode reader. The signals of the barcode reader are converted in the corresponding order number within the telephone through an encoding device and stored. The order number is then transmitted to a remote server. This method is suited only for images that can be converted within the mobile telephone.

It is therefore an aim of the invention to propose a new and improved order method.

It is a further aim of the present invention to propose an order method that is user-friendlier.

BRIEF SUMMARY OF THE INVENTION

According to the present invention, these aims are achieved in particular through the characteristics of the independent claims. Further advantageous embodiments are moreover described in the dependent claims and in the description.

In particular, these aims are achieved in that an image of the product to be ordered is recorded, in that the image data is transmitted to a server in a mobile radio network, in that a comparison of said image data with images stored in a product database in said server is performed, each of said images in said database being connected with an identification of the product provider, and in that a message containing an identification of the ordered product and of the ordering mobile user is then sent to said product provider.

This has the advantage that the mobile user does not have to enter any product codes and only sends an image of the desired product. The image can be recorded with a camera that is integrated in the mobile radio telephone or connected with the mobile radio telephone.

DESCRIPTION OF THE DRAWINGS

Hereafter, preferred embodiments of the invention will be described in more detail with the aid of the attached drawing, showing.

DETAILED DESCRIPTION OF THE INVENTION

Figure 1:
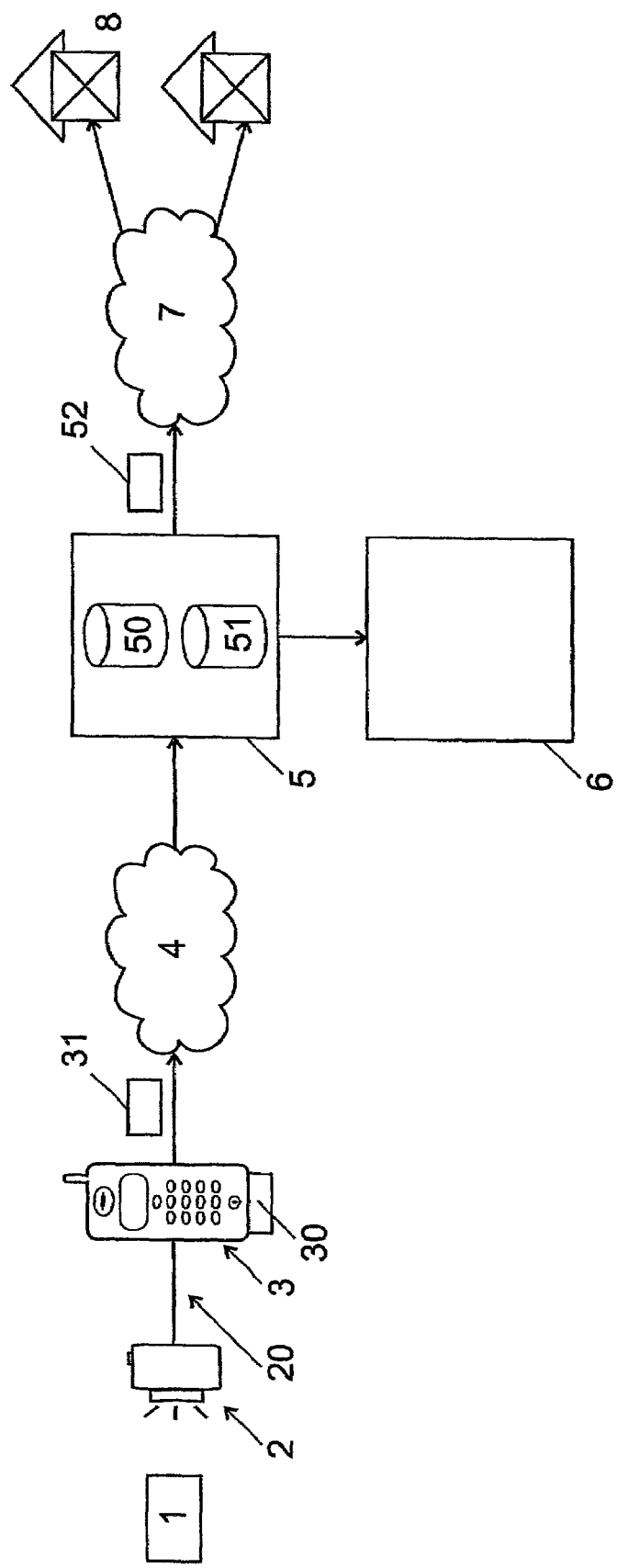
FIG. 1 an example of a system in which the method according to the invention can be used.

Although this invention describes in several details the special case of the embodiment in a GSM mobile radio network, the one skilled in the art will understand that this method can also be used with other types of radio networks, for example with AMPS, TDMA, CDMA, TACS, PDC, HSCCD, GPRS, EDGE or UMTS mobile radio networks, or with pager systems, or also in a contactless LAN or in a local network according to Bluetooth.

FIG. 1 shows diagrammatically a system with which the user of a mobile radio telephone 3 can order a product 1 from a provider 8. The reference number 1 shows a product or a part of a product with which the entire product can be identified, or an image that unambiguously identifies the product, for example a two-dimensional image in a catalog or on a poster, a product serial number, etc.

The element 2 is an image recording device, for example a camera with which images of three-dimensional objects can be taken, a scanner that is better suited for recording two-dimensional images, or a receiver, for example an internet-, DAB-(Digital Audio Broadcasting) or DVB (Digital Video Broadcasting) receiver, a television, etc. that can receive broadcast images and image programs. The image recording device 2 is integrated in a mobile radio telephone 3 or connected with such a mobile radio telephone over an interface 20, preferably a contactless interface at close range. The contactless interface 20 can for example consist of a Bluetooth, HomeRF or IrdA interface. The mobile radio telephone can for example preferably consist of a WAP-capable (Wireless Application Protocol), GSM, GPRS, EDGE or UMTS mobile device comprising an identification module 30, for example a SIM (Subscriber Identification Module) or WIM (WAP Identification Module) card. The mobile radio telephone operates preferably with an open operating system, for example with EPOC (trademark of Symbian), PalmOS (trademark of 3Com) or Windows CE (trademark of Microsoft), so that third party applications, in particular also JAVA applets can also be run. The user identification can occur by entering a PIN or through a biometric method.

The mobile radio telephone 3 can register into a mobile radio network 4 having a server 5. The server 5 comprises a user database 50, in which attributes of a plurality of mobile users in the mobile radio network 4 are stored, as well as a product database 51. The user attributes 50 comprise preferably the address, for example the mobile user's billing address and/or the delivery address for the delivery of the ordered item, as well as his order preferences, as will be explained further below.

The server 5 can for example be administered by the mobile radio network's operator, who usually has a reliable mobile user database from which the mobile user attributes in the user database 50 can be procured.

The reference number 6 shows a billing center with which ordered products are billed. Depending on the embodiment, the billing center is also integrated in the server 5 or connected with it. The billing center 6 can for example also be used to bill to the mobile radio users the telephone connections over the network.

The server 6 is connected with the providers 8 over a telecommunication network 7, for example over the public telephone network, over the ISDN, over a mobile radio network, over a private network, over the Internet or also over the normal post. Over the network 7, the server 5 can send messages to product providers, for example as e-mail, fax, by normal post, through a delivery firm etc. The product provider can then deliver the ordered product over a reverse channel (not represented) to the indicated address, for example and depending on the product as e-mail, as WAP, USSD or SMS message, by normal post, through a delivery firm etc. The data transmission between the server 5 and the providers 8 is preferably secured with TTP (Trusted Third Party).

The method according to the invention will now be described in closer detail.

A mobile radio user wishing to order a product 1 with the method according to the invention first has to record an image of this product with the image recording device 2 and transmit it into the mobile radio telephone over the interface 20. Depending on the kind of product and on the provider, the image can represent the entire product or only an identifying component of the product, for example a serial number or an information sticker on the product. The image can also be recorded from a catalog or an advertisement or be downloaded directly in the Internet or as DAB respectively DVB accompanying data.

The digitally recorded image is then preferably compressed, for example according to the JPEG, GIF, TIF or PDF format, and transmitted over said interface 20 to the mobile radio telephone 3. In a variant embodiment, the image data can also be compressed in the mobile radio telephone 3.

The image data is then stored in a storage area of the mobile radio telephone and can preferably be reproduced with its image reproduction means, for example with a LCD (Liquid Crystal Display) or VRD (Virtual Retina Display) image reproduction device, so that the mobile user can check the picture taken, possibly edit it and possibly designate a part with a pointer.

The order message 31 is prepared with the data processing means in the mobile radio telephone. The order message comprises the preferably compressed image data as well as a user identification, procured preferably from the identification module 30, for example the mobile user's IMSI (International Mobile Subscriber Identity). In addition, the mobile user can preferably enter his preferences with the order program, for example the desired billing method, the delivery mode, the delivery address, the ordered quantity etc. These preference indications are linked with the order message. At least certain preferences of the mobile user are preferably stored in a storage area of the identification module 30, so that they need not be entered again with each new order.

If the mobile user confirms with the order program that he wishes to order the recorded product, the order message 31 is sent through the mobile radio network 4 to the server 5. The order message can for example consist of a plurality of SMS messages, as described in patent EP689368. In a preferred embodiment, the order message, however, consists of a plurality of packages transmitted for example according to WAP, GPRS, EDGE, UMTS or TCP-IP. The order message can however also be transmitted as data over the voice channel, for example with a modem or in a UMTS network. The order message is preferably encrypted with the public key of the server 5 and signed with a certificate stored in the identification module 30, so that the server 5 can verify the message's origin and authenticity. The denial of the order can also be prevented through a clock stamp service.

The server 5 receives the order message and first verifies the mobile user's signature. If the message's authenticity and origin can be determined with this signature, the order message is decrypted with the server's private key and the image data decompressed.

A module in the server 5 then compares the decompressed image data with product images in the product database 51. This comparison is performed for example with a specially trained neuronal network or with other known image comparing algorithms, such as are used for example by image search engines in the Internet.

The product database 51 can preferably comprise several images of each offered product, so that the product comparison is also possible if very different pictures are sent. The product images are preferably provided by the providers 8 themselves and stored in the database 51, the used storage area being rented to the providers by the operator of the server 5.

If said module in the server finds a product image in the product database that could correspond with the received image data, it preferably sends a message, for example an SMS, USSD, e-mail, WAP or voice message to the mobile user, in which the found product identification, for example the name or a description of the found product, is indicated. The mobile user is then invited to confirm the result of this comparison. In the absence of any confirmation, the server tries to find another appropriate product in the product database, until the mobile user confirms a found product.

If the server does not find in the product database 51 any image that could correspond to the received image data and that is confirmed by the mobile user, an error message is preferably sent to the mobile user. The mobile user then has the possibility of entering further indications, for example a product code, a product name, the provider identification etc. in order to facilitate the comparison process.

In a preferred embodiment, the product database 51 can additionally contain indications about the available quantities of the offered product. This quantity is then automatically decremented with every order.

If a product is found in the product database 51 that corresponds to the received image data and that is confirmed by the mobile user, the server 5 tries to obtain additional mobile user attributes from the user database 50. The database 50 preferably contains for each mobile user identified with his mobile user identification, for example his IMSI or MSISDN, all attributes that allow the provider to identify completely the mobile user and to fully carry out the order. For example, the recorded mobile user attributes can comprise the mobile user's billing and delivery address as well as his user preferences, for example his preferred correspondence language, the desired delivery mode and billing method etc., insofar as these attributes are not indicated in the message 31.

These additional mobile user specific attributes are then linked with the product identification desired by the provider, for example with a product serial number, and a message 52 is sent over the telecommunication network 7 to the providers indicated in the product database 51.

The message 52 is preferably signed electronically and encrypted by the server 5, so that the recipient provider 8 can verify its authenticity and origin. In addition, a copy of the relevant elements is preferably sent to the billing center 6 so that the order can be billed to the mobile user. Depending on the mobile user preferences, the ordered product can preferably be billed like connections in said mobile radio network, for example by debiting a prepaid account in the mobile user's identification module 30 or with the telephone bill.

The provider who receives an order message in this manner can then deliver the ordered product or the desired information over a suitable delivery channel. If the ordered item can be digitized, it can be transmitted over an electronic channel, for example as e-mail or over FTP services through the Internet or as SMS or USSD over the mobile radio network 4. In this manner, user software, musical data, for example encoded in MP3 format, video data, for example encoded in an MPEG format, etc., a picture of whose cover has been transmitted, can for example be delivered. In addition, the provider 1 can preferably verify whether the terminal can receive the format of the electronic data and whether he still has sufficient storage capacity. For this test, JINI functions can for example be used.

With the method according to the invention, it is, however, also possible to order products that can only be delivered by post or by a delivery firm.

Apart from the earning opportunities through the offering of services from the described method, it is also possible to commercialize a server 5, in particular the software programs for such a server, as well as systems with an image recording device 2 and a specially programmed mobile radio telephone 3. The method according to the invention can however also be used with normal terminals, for example with a conventional camera 2 and a conventional mobile radio telephone 3 having a suitable interface at close range, for example a Bluetooth interface 20 over which they can communicate image data. In this case, the mobile radio telephone only needs a program with which image data can be compressed, encrypted, signed and linked with mobile user attributes. This program can for example be commercialized as an applet and downloaded over the mobile radio network 4.

| | |
|---|---|
| 1 | Product |
| 2 | Camera or scanner |
| 20 | Interface (Bluetooth, HomeRF, IrdA, etc.) |
| 3 | Mobile radio telephone |
| 30 | Identification card (SIM, WIM) |
| 31 | Order message |
| 4 | Mobile radio network |
| 5 | Flexmart-Server |
| 50 | Mobile user database |
| 51 | Product database |
| 52 | Linked data |
| 6 | Billing-Center |
| 7 | Telecommunication network (PSTN, Internet, GSM, . . . ) |
| 8 | Product provider |

The invention claimed is:

1. A method with which a mobile user in a mobile network can order products, comprising the steps of
transmitting an order message to a server in said mobile radio network,
sending a message containing an identification of the ordered product and of the ordering mobile user to a product provider,
recording a product image corresponding to the product to be ordered,
linking, by means of an identification module, the product image with a personal identification of the mobile user in said order message, and
comparing in said server said product image with stored images stored in a product database, each of said stored images in said database being linked with an identification of the product provider to which said message is sent.

2. The method of claim 1, wherein said product image is recorded with a camera connected with a mobile radio telephone.

3. The method of claim 1, wherein said product image is recorded with a scanner connected with a mobile radio telephone.

4. The method of claim 2, wherein said product image is an image of a two-dimensional identified part of said product.

5. The method of claim 1, wherein said product image is received by a radio receiver.

6. The method of claim 1, wherein said product image is recorded with an image recording device connected with a mobile radio telephone over a contactless interface at close range.

7. The method of claim 1, wherein said identification of the mobile user is the IMSI.

8. The method of claim 1, wherein said order message is a WAP message.

9. The method of claim 1, wherein said mobile radio network is a UMTS network and said order message is transmitted by establishing a connection in the data channel.

10. The method of claim 1, wherein said order message is signed electronically by said mobile radio user.

11. The method of claim 1, wherein said identification of the product provider contains his address in a telecommunication network.

12. The method of claim 11, wherein said telecommunication network is a TCP-IP network.

13. The method of claim 11, wherein said telecommunication network is the public telecommunication network.

14. The method of claim 1, wherein said server comprises a user database in which a plurality of mobile user attributes are stored and at least a portion of these attributes are forwarded to said product provider.

15. The method of claim 14, wherein said a plurality of mobile user attributes include the delivery address of the ordering mobile user.

16. The method of claim 14, wherein said additional a plurality of mobile user include the billing address of the ordering mobile user.

17. The method of claim 1, characterized in that the ordered product is billed by an operator of said server.

18. The method of claim 17, wherein said operator of said server also operates said mobile radio network and the ordered product is billed like connections in said mobile radio network.

19. The method of claim 18, wherein the ordered product is billed by debiting a prepaid account in the identification module of the mobile user.

20. The method of claim 18, wherein the ordered product is billed with the telephone bill.

21. A system with which a mobile user in a mobile network can order products, comprising:
- means for transmitting an order message to a server in said mobile radio network,
- means for sending a message containing an identification of the ordered product and of the ordering mobile user to a product provider,
- means for recording a product image corresponding to the product to be ordered,
- an identification module for linking the product image with a personal identification of the mobile user in said order message, and
- means for comparing, in said server, said product image with stored images stored in a product database, each of said stored images in said database being linked with an identification of the product provider to which said message is sent.

22. The system of claim 21, wherein said means for recording and a mobile radio telephone of said user including said means for transmitting are connected over a contactless interface at close range.

23. The system of claim 21, further comprising means for electronically signing said message.

24. The system of claim 21, further comprising means for compressing said recorded product images.

25. The system of claim 21, further comprising means for checking said recorded product images.

26. The system of claim 21, further comprising further comprising means for editing said recorded product images.

27. The system of claim 21, further comprising means for entering the user's preferences and for linking said preferences with said message.

28. The system of claim 21, wherein said system contains a clock stamp service to prevent a denial of the order.

* * * * *